US007599394B2

(12) United States Patent
Hosein et al.

(10) Patent No.: US 7,599,394 B2
(45) Date of Patent: Oct. 6, 2009

(54) COMMON RATE CONTROL METHOD FOR REVERSE LINK CHANNELS IN CDMA NETWORKS

(75) Inventors: Patrick Hosein, San Diego, CA (US); Tao Wu, Carlsbad, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1050 days.

(21) Appl. No.: 10/718,939

(22) Filed: Nov. 21, 2003

(65) Prior Publication Data

US 2004/0259560 A1 Dec. 23, 2004

Related U.S. Application Data

(60) Provisional application No. 60/478,798, filed on Jun. 16, 2003, provisional application No. 60/479,013, filed on Jun. 17, 2003, provisional application No. 60/509,160, filed on Oct. 7, 2003.

(51) Int. Cl.
*H04J 3/22* (2006.01)

(52) U.S. Cl. ........................ 370/468; 370/235; 370/252

(58) Field of Classification Search ................. 370/311, 370/468, 477, 310, 329, 335, 342, 229, 230, 370/230.1, 232, 233, 234, 235, 236, 252, 370/253

See application file for complete search history.

(56) References Cited

U.S. PATENT DOCUMENTS

| | | | | |
|---|---|---|---|---|
| 6,219,343 | B1 * | 4/2001 | Honkasalo et al. | 370/335 |
| 6,397,070 | B1 * | 5/2002 | Black | 455/453 |
| 6,490,460 | B1 * | 12/2002 | Soliman | 455/522 |
| 6,999,425 | B2 * | 2/2006 | Cheng et al. | 370/252 |
| 7,054,275 | B2 * | 5/2006 | Kim et al. | 370/252 |
| 7,158,796 | B2 * | 1/2007 | Tiedemann et al. | 455/453 |
| 2002/0141349 | A1 * | 10/2002 | Kim et al. | 370/252 |
| 2003/0073443 | A1 * | 4/2003 | Bae et al. | 455/450 |
| 2003/0078010 | A1 | 4/2003 | Davis | |
| 2003/0086397 | A1 * | 5/2003 | Chen | 370/335 |
| 2004/0179525 | A1 * | 9/2004 | Balasubramanian et al. | 370/391 |

(Continued)

FOREIGN PATENT DOCUMENTS

| | | |
|---|---|---|
| EP | 1 231 807 | 8/2002 |

(Continued)

OTHER PUBLICATIONS

Hosein P et al: "On the tradeoff between throughput and fairness on the reverse link of a 3G CDMA network", Globecom '04. IEEE Global Telecommunications Conference (IEEE CAT. No. 04CH37615) IEEE Piscataway, NJ, USA, vol. 6, 2004, pp. 3850-3854 vol. XP002338914.

(Continued)

*Primary Examiner*—Ricky Ngo
*Assistant Examiner*—Gary Mui
(74) *Attorney, Agent, or Firm*—Coats & Bennett, P.L.L.C.

(57) ABSTRACT

A mobile station dynamically adjusts its data transmission rate based on periodic load indications from a base station. The mobile station calculates a load tracking value based on two or more periodic load indications, and then calculates a rate change probability as a function of the load tracking value. The mobile station selectively changes its transmission rate responsive to a current load indication based on the rate change probability.

42 Claims, 7 Drawing Sheets

U.S. PATENT DOCUMENTS

| | | | | |
|---|---|---|---|---|
| 2004/0202136 | A1 * | 10/2004 | Attar et al. | 370/333 |
| 2004/0252669 | A1 | 12/2004 | Hosein | |
| 2005/0105604 | A1 * | 5/2005 | Ito et al. | 375/225 |

FOREIGN PATENT DOCUMENTS

| | | |
|---|---|---|
| EP | 1 246 384 | 10/2002 |
| WO | WO 2004/045239 | 5/2004 |

OTHER PUBLICATIONS

Young C. Yoon, Anthony C.K. Soong, S. Shawn Tsai, "Reverse Link Enhance-ments for CDMA2000 1x Revision D (E-REX) R2," 3RD Generation Partnership Project 2 "3GPP2", 3GPP2-C30-20030818-012, Aug. 2003. 38 pages.

Edward G. Tiedemann, Jr., Chair TSG-C WG3, "A Harmonized Reverse Link," 3RD Generation Partnership Project 2 "3GPP2", 3GPP2-C30-20030818-085, Aug. 19. 2003,10 pages.

Patrick Hosein, Tao Wu, Young C. Yoon, S. Shawn Tsai, Anthony C.K. Soong, "E-REX Reverse Link Per Sector Rate Control Algorithm and Performance," 3RD Generation Partnership Project 2 "3GPP2", 3GPP2-C30-20030714-015, Jul. 2003, 6 pages.

Tao Wu, Patrick Hosein, Anthony C.K. Soong, "RL Common Rate Control Performance Results with Different Number of Rate Control Bits," 3RD Generation Partnership Project 2 "3GPP2", 3GPP2-C30-20030915-010, Sep. 2003, 5 pages.

Rath Vannithamby, Tao Wu, Patrick Hosein, Anthony C.K. Soong, "Reverse Link Common Rate Control Mechanism," 3RD Generation Partnership Project 2 "3GPP2", 3GPP2-C21-20030915-0XX, Sep. 2003, 4 pages.

Tao Wu, Patrick Hosein, Anthony C.K. Soong, "Ericsson Common Rate Control Algorithm Performance," 3RD Generation Partnership Project 2 "3GPP2", 3GPP2-C30-20030930-010, Oct. 2003, 6 pages.

* cited by examiner

COMMON RATE CONTROL METHOD FOR REVERSE LINK CHANNELS IN CDMA NETWORKS

RELATED APPLICATIONS

This application claims priority under 35 U.S.C. § 119(e) from the following U.S. provisional applications: Application Ser. No. 60/478,798 filed on Jun. 16, 2003, Application Ser. No. 60/479,013 filed on Jun. 17, 2003, and the application of Tao Wu, Patrick Hosein, and Anthony C.K. Soong titled "Ericsson Generalized Common Rate Control Algorithm" filed Oct. 7, 2003 60/509,160. These applications are incorporated in their entirety by reference herein.

BACKGROUND OF THE INVENTION

In code division multiple access (CDMA) networks, the mobile stations share a reverse link channel and may transmit simultaneously on the reverse link channel. During transmission, each mobile station spreads its transmitted signal with a spreading code selected from a set of mutually orthogonal spreading codes. The base station is able to separate the signals received from the mobile stations by a correlation process. For example, if the base station desires to receive the signal transmitted by mobile station A, the base station correlates the received signal with the spreading code used by mobile station A to despread the signal from mobile station A. All other signals will appear as noise due to lack of correlation. The base station can despread signals from all other mobile stations in the same manner.

CDMA networks are interference-limited systems. Since all mobile stations operate at the same frequency, internal interference generated within the network plays a critical role in determining system capacity and signal quality. The transmit power from each mobile station contributes to the noise floor and needs to be controlled to limit interference while maintaining desired performance objectives, e.g., bit error rate (BER), frame error rate (FER), capacity, dropped-call rate, coverage, etc. If the noise floor is allowed to get too high, widespread outages may occur. An outage is considered to occur when the power required to maintain minimum signal quality standards is greater than the maximum transmit power of the mobile station.

Rate control is one technique used to control the transmit power of a mobile station in a CDMA network. In general, the power required to maintain a desired signal quality increases as the data rate for transmission increases, and decreases as the data rate for transmission decreases. When a mobile station is commanded to transmit at a given data rate, the mobile station will transmit at the minimum power level needed to maintain acceptable signal quality standards. Thus, one way of controlling the transmit power of a mobile station is to dynamically adjust the data transmission rate of the mobile stations depending on reverse link load.

One rate control technique is known as common rate control. With common rate control, all mobile stations that need to transmit data in the reverse link are allowed to do so. Each mobile station initially begins transmitting at a specified minimum rate (sometimes called the autonomous rate) and then, depending on load of the base stations in its active set, is allowed to vary its transmission rate. The base stations periodically estimate the reverse link load and compare the estimated reverse link load to a target load. If the load is below a target threshold, a base station commands the mobile stations in its cell to increase their transmission rate. Conversely, if the load is above the target threshold, a base station commands the mobile stations in their respective cells to decrease their transmission rate. In some cases, the base station may command the mobile stations to hold their current transmission rate.

With common rate control, a base station broadcasts a single up/down/hold rate control command to all mobile stations in a cell or sector and all of the mobile stations respond to the extent that they are able. That is, when a base station commands the mobile stations in a cell to increase their transmission rate, all mobile stations in the cell except those already transmitting at maximum power will increase their transmission rate. When a base station commands the mobile stations in a cell to decrease their transmission rate, all mobile stations except those already transmitting at minimum power will decrease their transmission rate. Thus, common rate control results in significant fluctuations in load at the base station. These fluctuations are taken into account when setting the target load. Increasing the target load, in general, will increase system throughput at the risk of more frequent outages. Decreasing the target load will reduce outages at the cost of decreased throughput. The target load is therefore selected to balance system throughput against the probability of outages.

SUMMARY OF THE INVENTION

The present invention comprises a method and apparatus for implementing common rate control in a reverse link channel in a CDMA network. A base station periodically (e.g., once per frame) estimates the reverse link load and broadcasts a quantized load indication to mobile stations transmitting on the reverse link channel. The mobile stations dynamically adjust their data transmission rate at least in part on the periodic load indications from the base station. In one embodiment, the mobile stations calculate a load tracking value based on two or more periodic load indications, and then calculate a rate change probability as a function of the load tracking value. The mobile stations selectively change their transmission rate responsive to a current load indication based on the rate change probability. The rate change probability determines the probability that the mobile stations will change its data transmission rate in the current evaluation period. Consequently, some number of mobile stations will change rates, and some other number of mobile stations will continue to transmit at their current rate.

In some exemplary embodiments, a mapping function is used to map load tracking values to corresponding rate change probabilities. The probability generally varies with distance of the load tracking value from a desired target value. In some embodiments, the rate change probability varies linearly with distance from the target value over a defined range of load tracking values. The defined range in which the rate change probability varies linearly may be the entire load tracking range, or a portion of the load tracking range. In other embodiments, the mapping function may use a non-linear function to map load tracking values to rate change probabilities. In other embodiments, the load tracking function itself may evaluate to a probability so a separate mapping function is not required.

In some embodiments of the invention, the rate change probabilities may be mobile station dependent, user class dependent, or quality of service (QoS) dependent. For example, a sliding window may be employed to make rate change probabilities dependent on the current data transmission rate or current transmit power level of the mobile station. As a further example, users may be divided into two or more distinct classes, which are assigned biasing factors to bias the rate change probabilities in favor of a particular group or class.

DETAILED DESCRIPTION OF THE INVENTION

Figure 1:
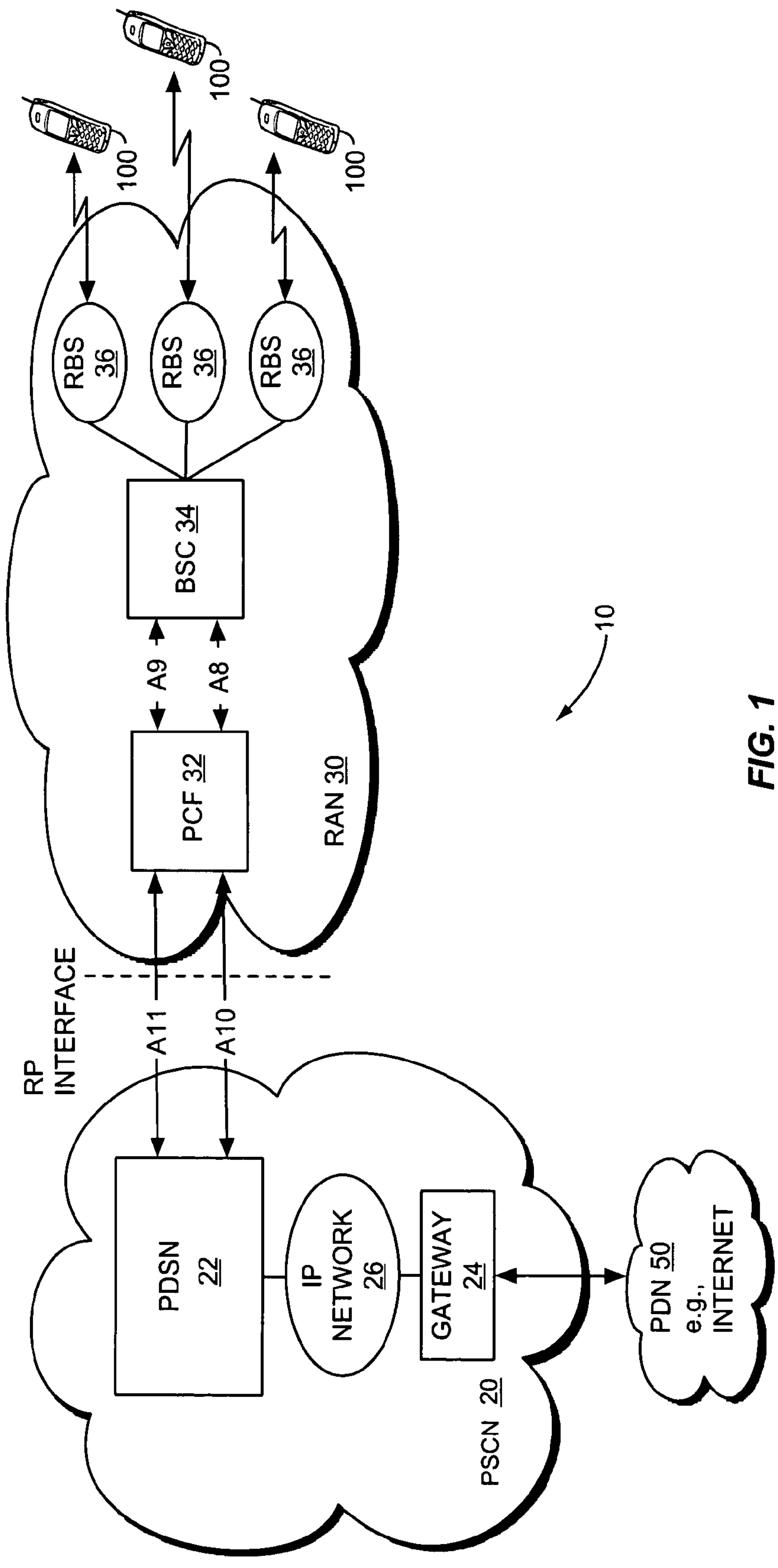
FIG. 1 is a diagram of an exemplary wireless communication network according to one or more embodiments of the present invention.

Turning to the drawings, FIG. 1 illustrates an exemplary wireless communication network 10 in which the present invention may be implemented. Network 10 may be any packet-switched communication network, for example, cdma2000 wireless network according to the IS-2000/2001 families of standards. However, those skilled in the art will appreciate that the wireless communication network may be configured according to other standards, such as Wideband CDMA (WCDMA) standards, for example.

Network 10 includes a Packet-Switched Core Network (PSCN) 20 and a Radio Access Network (RAN) 30. The PSCN 20 provides connection to one or more Public Data Networks (PDNs) 50, such as the Internet. The PSCN 20 includes a packet data serving node (PDSN) 22, a gateway 24, and an IP network 26. The details of the PSCN 20 are not material to the present invention and, therefore, the PSCN 20 is not discussed further herein. The RAN 30 provides the radio interface between the mobile stations 100 and the PCSN 12. An exemplary RAN 30 comprises a Packet Control Function (PCF) 32, one or more Base Station Controllers (BSC) 34, and a plurality of Radio Base Stations (RBSs) 36. BSCs 34 connect to the RBSs 36 to the PCF 32. Mobile stations 100 communicate with the RBSs 36 via the air interface as defined by the appropriate network standards, such as the IS-2000 family of standards.

Figure 2:
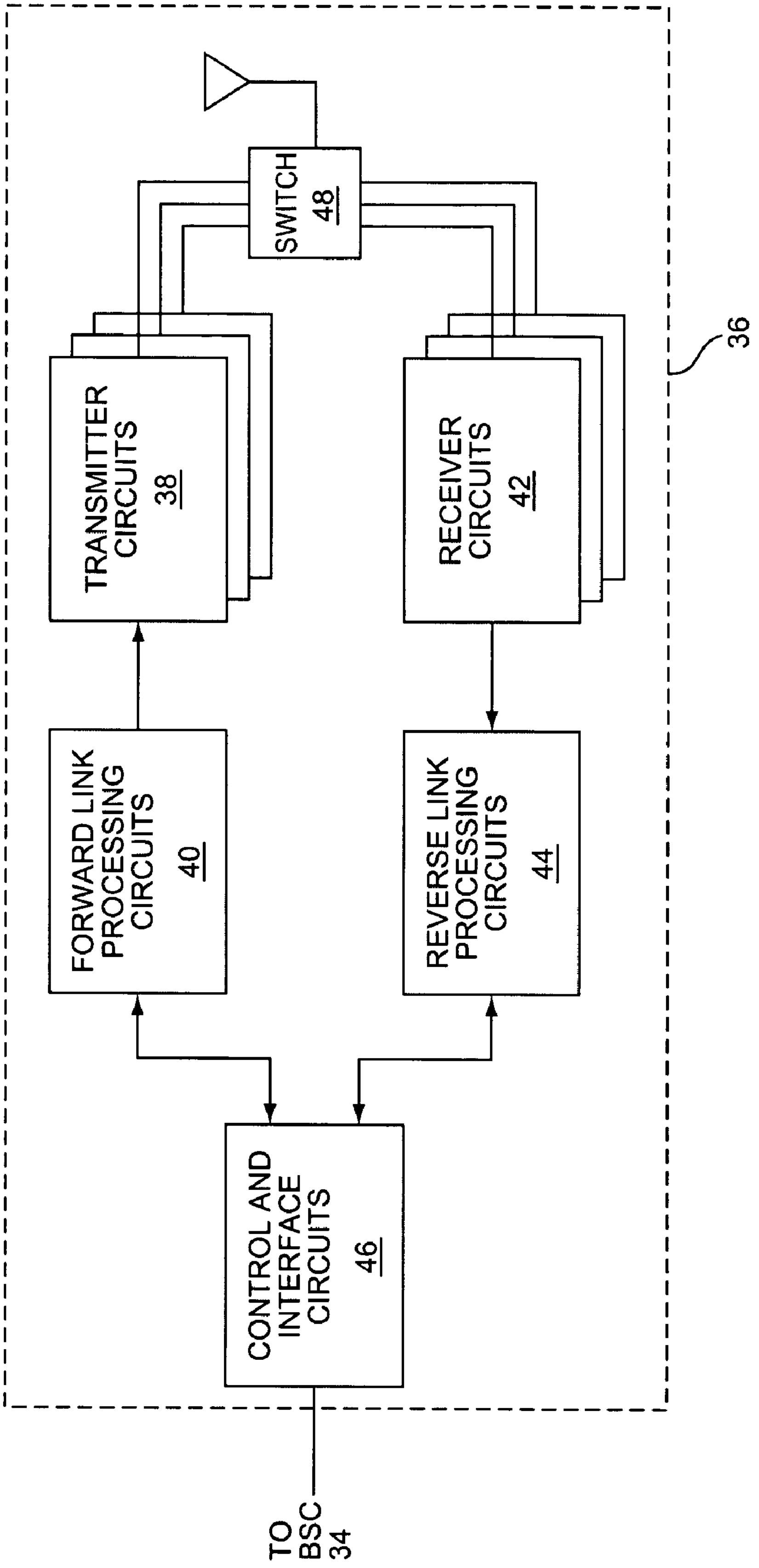
FIG. 2 is a diagram of exemplary functional details for a radio base station according to the present invention.

FIG. 2 illustrates a functional diagram of an exemplary RBS 36 according to one embodiment of the present invention. It will be appreciated that the present invention is not limited to the RBS architecture illustrated in FIG. 2, and that other RBS architectures are applicable to the present invention. The functional elements of FIG. 2 may be implemented in software, hardware, or some combination of both. For example, one or more of the functional elements in RBS 36 may be implemented as stored program instructions executed by one or more microprocessors or other logic circuits included in RBS 36.

As shown in FIG. 2, RBS 36 includes transmitter circuits 38, forward link signal processing circuits 40, receiver circuits 42, reverse link signals processing circuits 44, and control and interface circuits 46. The transmitter circuits 38 include the necessary RF circuits, such as modulators and power amplifiers, to transmit signals to mobile stations 100. The forward link signal processing circuits 40 process the signals being transmitted to the mobile stations 100. Forward link signal processing may include digital modulation, encoding, interleaving, encryption, and formatting. The receiver circuits 42 comprise the RF components, such as a receiver front end, necessary to receive signals from the mobile stations 100. Reverse link processing circuits 44 process the signals received from the mobile stations 100. Reverse link processing may include, for example, digital demodulation, decoding, de-interleaving, and decryption. Control and interface circuits 46 coordinate the operation of the RBS 36 and the mobile stations 100 according to the applicable communication standards and interface the RBS 36 with the BSC 34. The forward link processing circuits 40, reverse link processing circuits 44, and control and interface circuits 46 may be integrated in a single processor, or may be implemented in multiple processors, hardware circuits, or a combination of processors and hardware circuits.

Figure 3:
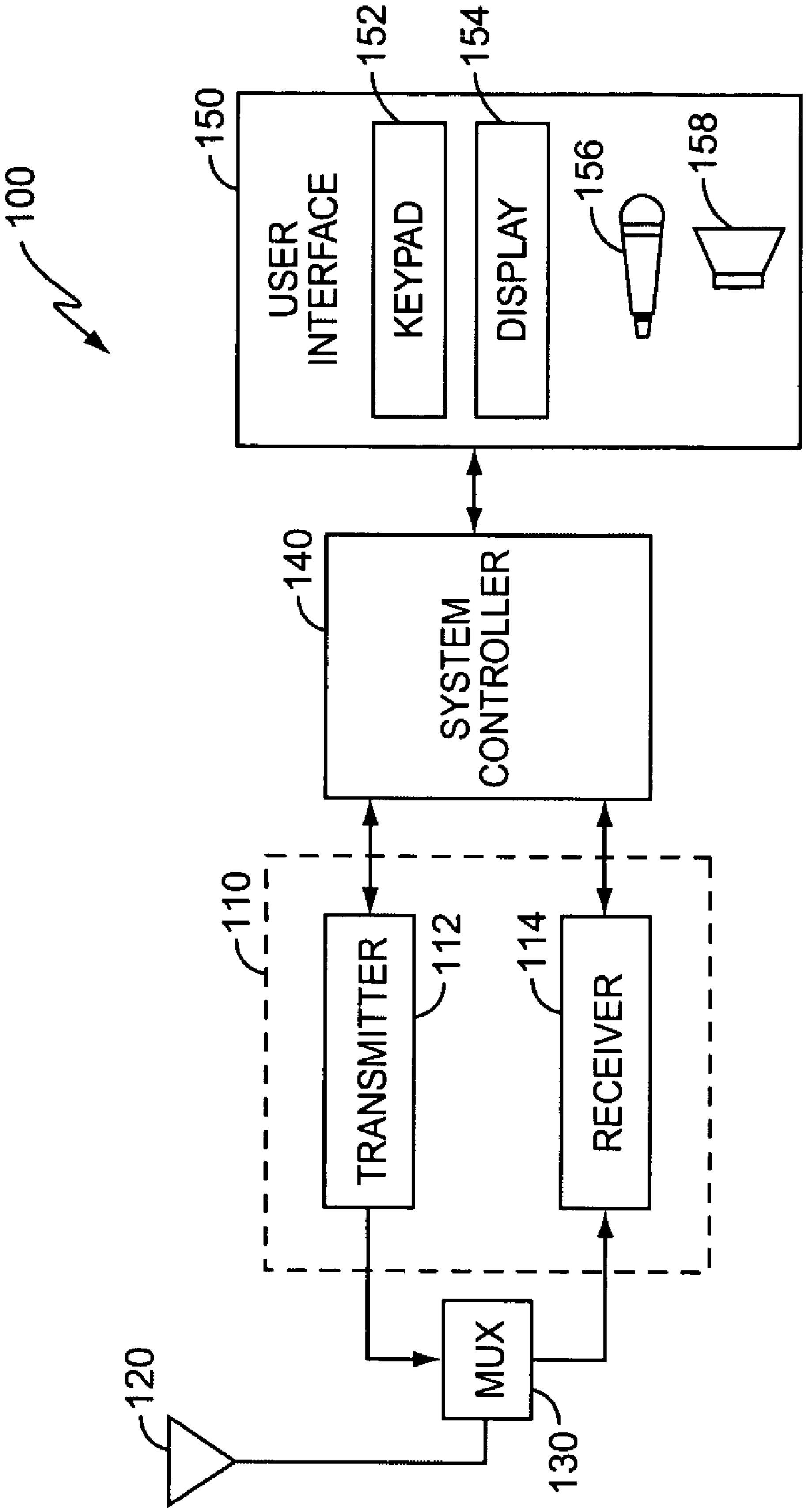
FIG. 3 is a functional block diagram of an exemplary mobile station according to the present invention.

FIG. 3 is a functional block diagram of an exemplary mobile station 100 according to one embodiment of the present invention. As used herein, the term "mobile station" may include a cellular radiotelephone, a Personal Communications System (PCS) terminal that may combine a cellular radiotelephone with data processing, facsimile, and data communications capabilities; a Personal Data Assistant (PDA) that may include a pager, Web browser, radiotelephone, Internet/intranet access, organizer, calendar, and a conventional laptop and/or palmtop receiver or other appliances that include a radiotelephone transceiver.

Mobile station 100 includes a transceiver 110 connected to an antenna 120 via a multiplexer 130 as known in the art. Mobile station 100 further includes a system controller 140, and a user interface 150. Transceiver 110 includes a transmitter 112 and a receiver 114. Transceiver 110 may, for example, operate according to the cdma2000, WCDMA or UMTS standards. The present invention, however, is not limited to use with these standards and those skilled in the art will recognize the present invention may be extended or modified for other standards.

System controller 140 provides overall operational control for the mobile station 100 according to programs instructions stored in memory. System controller 140 may comprise a microprocessor or microcontroller and may be part of an application specific integrated circuit (ASIC). Memory represents the entire hierarchy of memory in a mobile station 100. Memory provides storage for data, operating system programs and application programs. Memory may be integrated with the system controller, or may be implemented in one or more discrete memory devices.

User interface 150, typically comprising a keypad 152, display 154, microphone 156 and/or speaker 158. Keypad 152 allows the operator to enter commands and select menu options while display 154 allows the operator to see menu options, entered commands, and other service information. Microphone 156 converts the operator's speech into electrical audio signals and speaker 158 converts audio signals into audible signals that can be heard by the operator. It will be understood by those skilled in the art that mobile station 100 may comprise a subset of the illustrated user interface elements or mobile station 100 may comprise additional user interface elements not shown or described herein.

The RBS 36 communicates with a plurality of mobile stations 100. In the exemplary embodiment, the mobile stations 100 transmit data to the RBS 36 over a reverse link channel that is rate controlled. The reverse link channel is preferably, but not necessarily, one designed for packet data. Multiple mobile stations 100 can transmit simultaneously on the reverse link channel and the RBS 36 distinguishes their respective signals by the spreading codes that are assigned to the mobile stations 100 at connection setup. When the RBS 36 despreads the signal received from a given mobile station 100, the transmission from all other mobile stations 100 appear as noise. The quality of a signal received from a given mobile station 100 by the RBS 36 depends on thermal noise and the noise generated by all the other mobile stations 100. The total noise is dependent on the number of mobile stations 100 simultaneously transmitting on the reverse link and the transmission power of those mobile stations 100.

Signal to noise ratio (SNR) is one measure of the quality of the received signal. To maintain minimum signal quality standards, the mobile station 100 must transmit with enough power to maintain the SNR of the received signal above a predetermined level. If the noise floor (thermal noise+noise from other mobile stations 100) gets too high, the required transmit power to maintain the minimum signal quality standards, may exceed the maximum transmit power of the mobile station 100. This condition is referred to as an outage.

Common rate control is one technique to control the amount of interference on a reverse link channel. The general aim of common rate control is to maintain the reverse link load as close as possible to a desired target load so that the number of outages is maintained at an acceptable level, e.g. 1% while utilizing the reverse link channel to the fullest extent possible. In most common rate control schemes, mobile stations 100 that have data to transmit are allowed to transmit. Initially, a mobile station 100 begins transmitting at a very low rate called the autonomous rate, which may for example be a rate of 9.6 kbps. After a mobile station 100 begins transmitting data, it is allowed to vary its transmission rate depending on reverse link load. The RBS 36 periodically estimates the reverse link load and transmits a load indication to all of the mobile stations 100 transmitting on the reverse link channel. Each mobile station 100 decides whether to increase or decrease its transmission rate based at least in part on the load indication from the RBS 36. Rate adjustment decisions by the mobile stations 100 will tend to follow the load indications from the RBS 36. If the reverse link load at the RBS 36 increases above the target load, the mobile stations 100 in general will decrease their transmission rate to reduce the reverse link load. Conversely, if the reverse link load at the RBS 36 decreases below the target load, the mobile stations 100 in general will increase their transmission rate to increase the load and more efficiently use the reverse link channel. The rate adjustment decision of an individual mobile station 100, however, may not follow the load indication at a given time instant, since other factors (e.g., user class, QoS information, power limitations, etc.) may be evaluated in making rate control decision.

Common rate control requires no rate feedback information from the mobile stations 100 to the RBS 36, and the RBS 36 broadcasts load indications to all mobile stations 100 on a common control channel. Consequently, common rate control requires a low signaling overhead and is low in implementation complexity. However, common rate control requires that the target load be adjusted to provide sufficient margin to account for expected fluctuations in system load. It is therefore desirable that fluctuations in load be minimized as much as possible so that the target load can be as close as possible to the maximum load.

Figure 4:
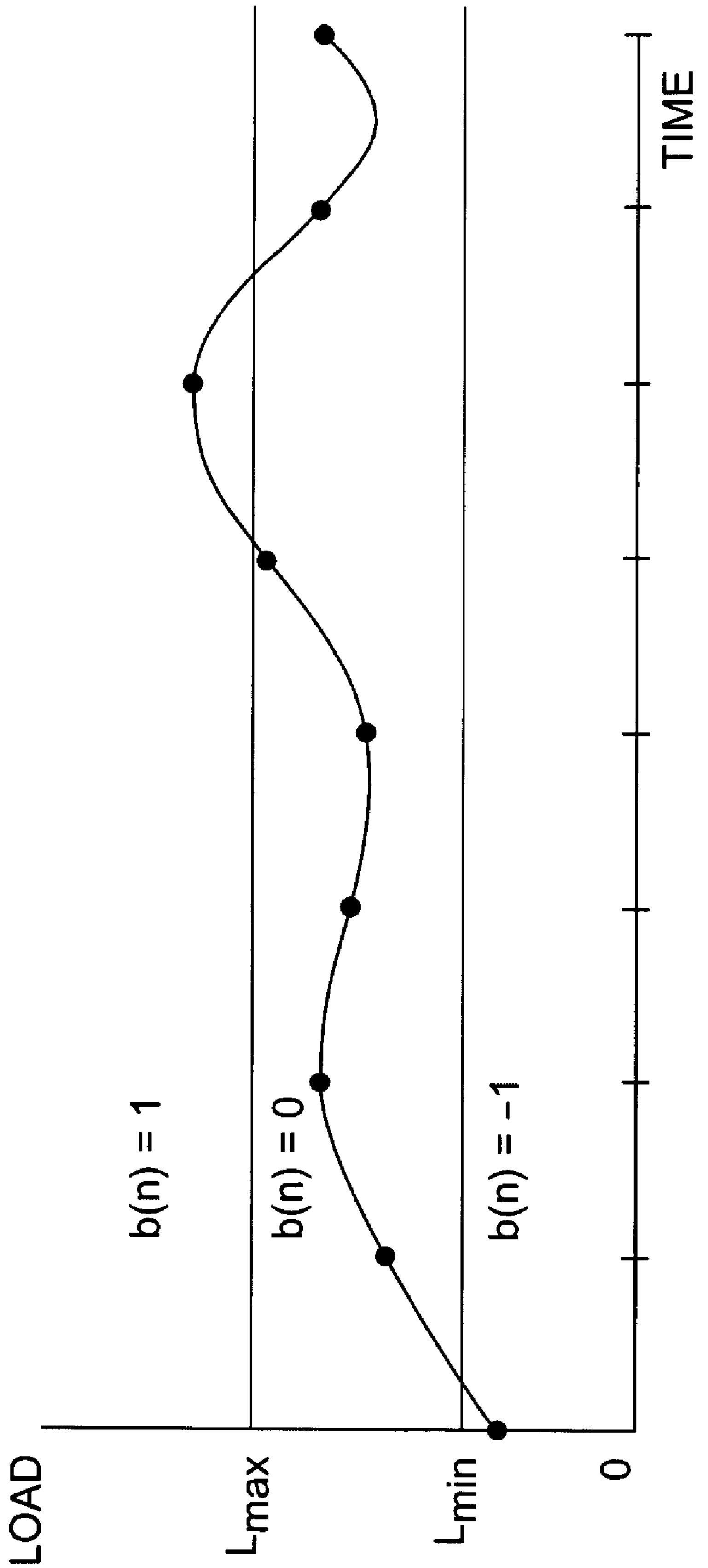
FIG. 4 illustrates an exemplary load curve for a base station using common rate control according to the present invention.

FIG. 4 is a graph illustrating reverse link load in a CDMA network implementing common rate control. In FIG. 4, the vertical axis represents the reverse link load, and the horizontal axis represents time. $L_{MAX}$ is the maximum load beyond which the system is unstable and outages are likely to occur. $L_{MIN}$ is the load below which the system is considered lightly loaded.

During operation the RBS 36 periodically estimates the reverse link load and determines the load indication to broadcast to the mobile stations 100 transmitting on the reverse link. The evaluation period may be once per frame. Evaluation periods longer or shorter than once per frame are also within the scope of the invention. If L(n) denotes the estimate of the reverse link load at the nth evaluation period and b(n), the RBS 36 may determine the corresponding load indication as follows:

$$\text{if } (L(n) >= L_{MAX}) \{\text{set } b(n)=1\}$$

$$\text{else if } (L(n) <= L_{MIN}) \{\text{set } b(n)=-1\}$$

$$\text{else } \{\text{set } b(n)=0\} \quad \text{Eq. 1}$$

The load indication b(n) may comprise, for example, a one or more reverse activity bits (RABs) that are transmitted to the mobile stations 100 during each evaluation period.

The mobile stations 100 receive the load indications b(n) from the RBS 36 and decide whether to change their data transmission rate in the next evaluation period, e.g. frame. Upon receipt of the load indication b(n) from the RBS 36, the mobile stations 100 evaluate a load tracking function to generate a load tracking value. The load tracking value serves as a mobile station estimate of the reverse link load. The load tracking function is preferably one that filters or smoothes the load indications b(n) received from the RBS 36 over a plurality of evaluation periods and converts the quantized load indications b(n) into a continuous load tracking value. In this context, the phrase "continuous load tracking value" means that the value of the load tracking function may assume any value within a defined range of values. Thus, the load estimation process at the base station converts continuous load estimates into quantized values and the load estimation process at the mobile station converts the quantized load estimates back into a continuous load tracking value.

The load tracking function may be any function that provides a smoothed estimate of reverse link load from the periodic load indications b(n). If y(n) is the load tracking value, then the load tracking value y(n) may be computed according to:

$$y(n)=\alpha b(n)+(1-\alpha)y(n-1) \quad \text{Eq. 2}$$

where the term y(n−1) represents the load tracking value computed at time n−1 and the constant α is a smoothing factor. Eq. 2, in effect, computes a weighted average of the load indications from the RBS 36 over a plurality of evaluation periods. The value of α, which is in the range of 0 to 1, determines the weight given to the load indication for the current evaluation period. When set to a value between 0 and 1, the smoothing factor α causes the weight of a periodic load indication for a current evaluation period to exponentially diminish in subsequent evaluation periods. When the smoothing factor α=1, the term (1−α)y(n−1) is 0 so that the load tracking value y(n) will always equal the load indication b(n) for the current evaluation period. When the smoothing factor α equals 0, the load tracking value y(n) does not change from one evaluation period to the next.

After updating the load tracking value y(n), the mobile stations 100 determine whether to change rate in the next evaluation period or frame. This rate change determination is made by mapping the load tracking value y(n) to a rate change probability P(n). The mobile stations 100 then probabilistically change their data transmission rate in the reverse link channel based on the rate change probability P(n). One way to implement the probabilistic rate change is to make the rate change determination dependent on a random event. For example, the mobile stations 100 may each generate a random number between 0 and 1, and compare the random number with the rate change probability P(n). If all the mobile stations 100 receive the load indications b(n) without error, then all the mobile stations 100 should compute the same or nearly the same rate change probability P(n). The only exception would be where a mobile station 100 has been transmitting for only a few frames. If the rate change probability is, for instance 0.67, mobile stations 100 generating a random number between 0 and 0.67 would change data transmission rates. Those mobile stations 100 generating random numbers between 0.67 and 1 would continue transmitting at their current data transmission rates. Thus, some number of mobile stations 100 will change data transmission rates, and some other number of mobile stations 100 will not, reducing fluctuations in the reverse link load.

Figure 5:
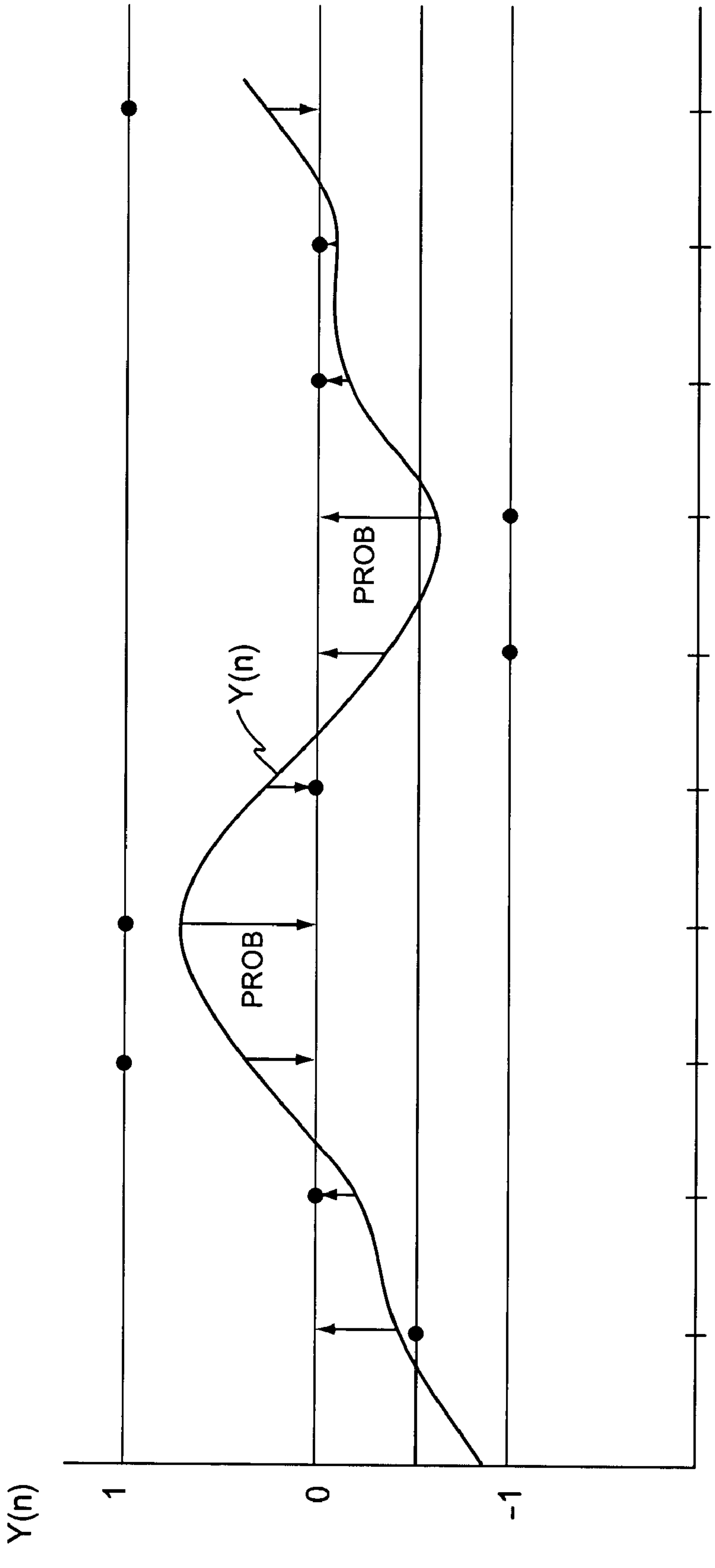
FIG. 5 illustrates an exemplary load tracking curve for a mobile station using common rate control according to the present invention.

In one embodiment of the invention, the probability P(n) of changing rate is dependent upon the distance of the load tracking value y(n) from a target load tracking value as illustrated in FIG. 5. Since the load tracking value of Eq. 2 varies between −1 and 1, the target load tracking value may be set equal to 0 and the mapping of the load tracking value to a rate change probability may be according to:

$$P(n)=|y(n)| \qquad \text{Eq. 3}$$

The probability that a mobile station 100 will change rate will depend on how far the load tracking value y(n) is above or below 0.

There may be some conditions under which the mobile station 100 does not change rate. For example, if a mobile station 100 transmitting at the minimum rate, it cannot reduce its rate. Similarly, a mobile station transmitting at the highest rate cannot increase rate. Also, in the mobile station 100 must have sufficient power headroom to increase its rate even if it is not currently at the maximum rate. If hybrid automatic repeat request (HARQ) is used, the mobile station 100 may be required to retransmit a frame at a specified rate, which may be the same rate as the original transmission or at a higher rate.

Figure 6:
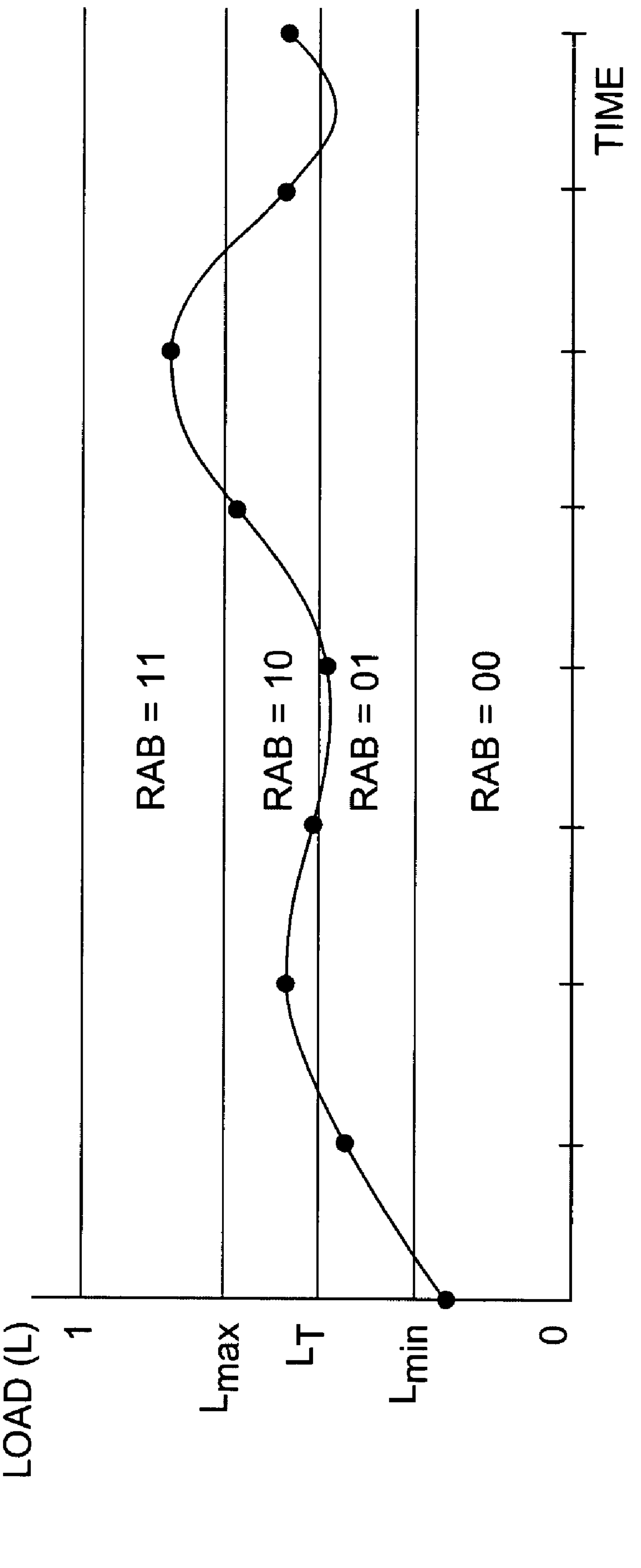
FIG. 6 illustrates an exemplary load curve for a base station using common rate control according to a second embodiment of the present invention.

FIG. 6 is a graph illustrating the reverse link load in an alternate embodiment of the present invention. In FIG. 6. $L_{MAX}$ is the maximum load beyond which the system is unstable and outages are likely to occur. $L_{MIN}$ is the load below which the system is considered lightly loaded. $L_T$ is a target load at which the RBS 36 should operate. The values $L_{MAX}$, $L_T$, and $L_{MIN}$ divide the range of possible load values into four regions, which can be indicated by two bits. In this embodiment, the RBS 36 determines the load indication b(n) as follows:

$$\text{if } (L(n)>L_{MAX})\{\text{set } b(n)=2\}$$

$$\text{else if } (L_T>=L(n)>L_{MIN})\{\text{set } b(n)=-1\}$$

$$\text{else } \{\text{set } b(n)=-2\} \qquad \text{Eq 4}$$

The load indication b(n) may comprise, for example, a pair of reverse activity bits (RABs) with the values shown in FIG. 6.

In the alternate embodiment shown in FIG. 6, the mobile stations 100 may calculate the load tracking value y(n) using the load tracking function represented by Eq. 2. In that case, the load tracking value y(n) will vary in the range of −2 to 2. After computing the load tracking value y(n), the mobile stations 100 next determine a rate change probability P(n) based on the load tracking value y(n). Again, the mapping of the load tracking value y(n) may be dependent on the distance of the load tracking value y(n) from a reference value. Since the load tracking range is symmetric about 0, the load tracking value may be according to:

$$P(n)=\min\{1,|y(n)|\} \qquad \text{Eq. 5}$$

When the load tracking value y(n) is greater than 0, the rate change probability P(n) is the greater of y(n) and 1. When y(n) is less than to 0, the rate change probability P(n) is the greater of 1 and −y(n). In this example, when y(n) is greater than or equal to 1 or less than or equal to −1, the rate change probability P(n)=1. When Y(n) is less than 1 and greater than −1, the rate change probability P(n) varies linearly with the distance of the load tracking value from 0. This is a bounded linear mapping of y(n) to P(n). By scaling y(n) so that it assumes a maximum value of 1 and a minimum value of −1, an unbounded linear mapping from y(n) to P(n) may be obtained. In the exemplary embodiment of FIG. 6, the rate change probability may the mapped linearly to a rate change probability by the scaling function:

$$P(n)=\frac{|y(n)|}{2} \qquad \text{Eq. 6}$$

The scaling function shown in Eq. 6, in effect, maps y(n) to P(n) linearly with respect to distance over the entire range of possible load tracking values.

Those skilled in the art will appreciate that mapping from y(n) to a rate change probability P(n) can be a general mapping and need not be restricted to the linear mappings. Eqs. 7 and 8 below are mapping functions that illustrate one approach to calculating rate change probabilities based on an expected load value. In this example, it is assumed that the load tracking value y(n) varies between −1 and 1. When y(n)>0, the load tracking value y(n) can be mapped non-linearly to a downward rate change probability $P_d(n)$ according to:

$$P_d(n)=\frac{2y(n)(\beta-1)}{1+y(n)(\beta-1)} \qquad \text{Eq. 7}$$

When y(n)<0, the load tracking value can be mapped non-linearly to an upward rate change probability $P_u(n)$ according to:

$$P_u(n)=\frac{-y(n)(\beta-1)}{1+y(n)(\beta-1)} \qquad \text{Eq. 8}$$

In Eqs 7 and 8, β is a load ratio that specifies the ratio of a desired target load to the maximum load. Eqs. 7 and 8 map the load tracking value y(n) non-linearly to a corresponding rate change probability P(n) such that the expected load following the rate change will be at a desired target load.

In some embodiments of the invention, the mapping of the load tracking value to a rate change probability can be made mobile dependent, QoS dependent, or user class dependent.

As an example of user class dependent rate change probabilities, assume that the mobile stations 100 are classified into three classes: gold, silver and bronze. If $\gamma_i$ represents a class dependent adjustment factor, a mobile station 100 in class i computes the rate change probability as follows:

$$\text{if } y(n)>\gamma_i\{\text{set } P(n)=\min(1,(y(n)-\gamma_i)/(1-\gamma_i)\}$$

$$\text{if } y(n)<\gamma_i\{\text{set } P(n)=\min(1,(\gamma_i-y(n))/(\gamma_i+1)\}$$

$$\text{else if } \{\text{set } P(n)=0\} \quad \text{Eq. 9}$$

Note that values of $\gamma_i$ are selected such that $$\sum_i \gamma_i = 0$$

for all classes. If $\gamma_i$=0.5 for gold users, $y_{i=}0$ for silver users, and $\gamma_i\approx-0.5$ for bronze users, users in the higher classes will be favored and will get a larger fraction of the available load.

Figure 7:
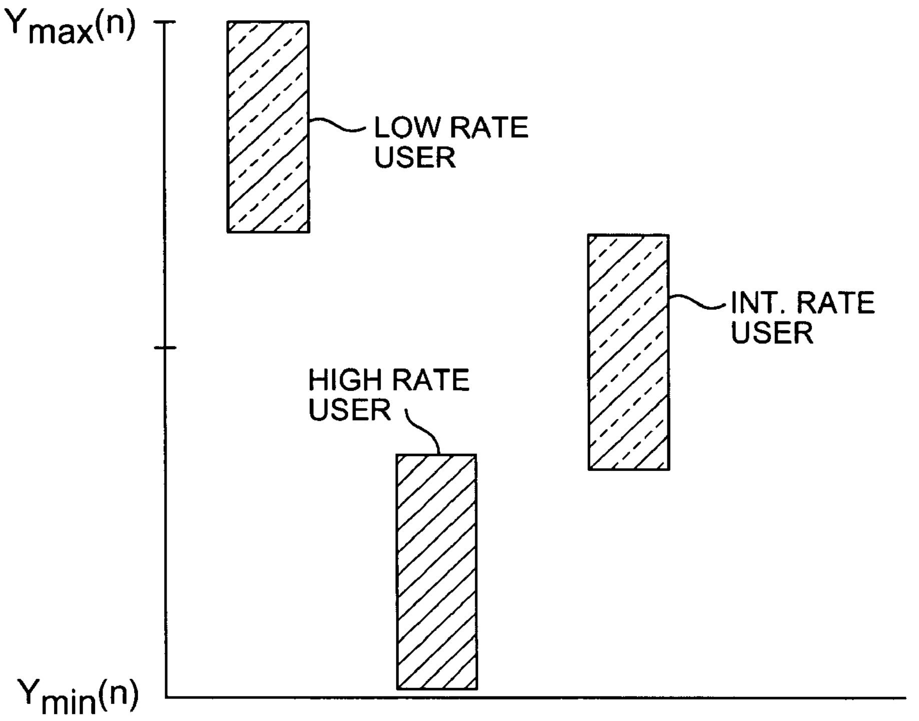
FIG. 7 illustrates a rate dependent sliding window for common rate control according to the present invention.
Figure 8:
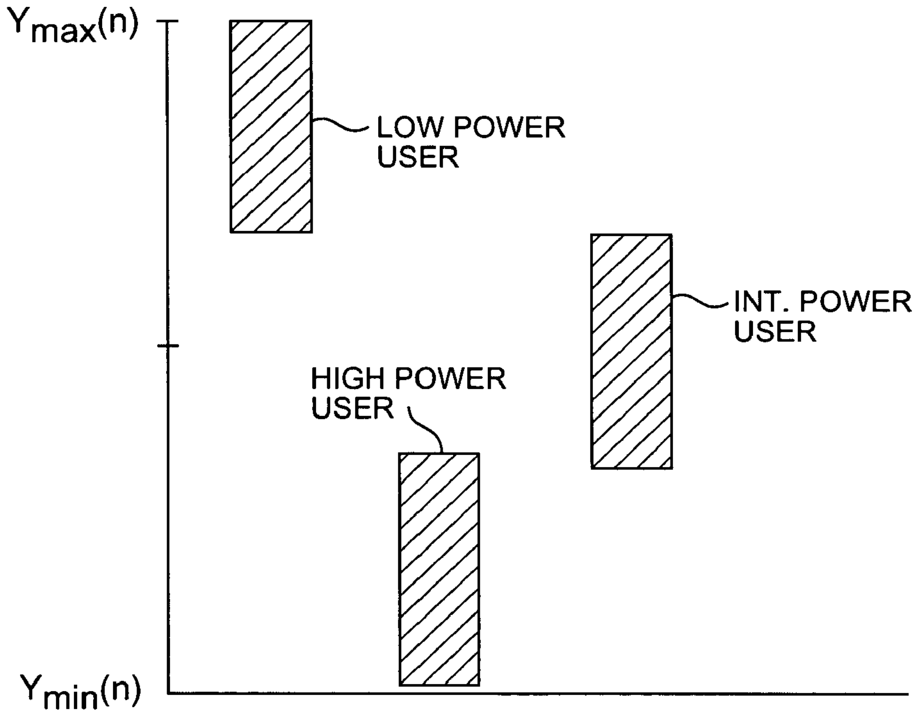
FIG. 8 illustrates a power dependent sliding window for common rate control according to the present invention.

The calculation of the rate change probabilities of the mobile station 100 may, in some embodiments, be made mobile dependent. Referring to FIG. 8, a sliding window or mask over the load tracking range is defined for each mobile station 100. The size $S_k$ of the sliding window may be the same for all mobile stations 100, or may be different for different classes of users. The size $S_k$ of the sliding window may be fixed for each user or may be dynamically adjusted. The size of the sliding window will be some value less than $Y_{MAX}-Y_{MIN}$. As shown in FIG. 7, the position of the sliding window for a given mobile station 100 is dependent on the current transmission rate of the mobile station 100. For very low rate users, the sliding window will be near the top of the load tracking range. For high rate users, the sliding window will be near the bottom of the load tracking range. For mobile stations 100 operating at transmission rates somewhere in the middle, the sliding window will be somewhere in the middle of the load tracking range. If $R_{MAX}$ is the maximum transmission rate, is $R_{MIN}$ the minimum transmission rate, and $R_K$ is the current transmission rate, the position of the sliding window may be computed according to:

$$T_{MAX}=S_k(R_{MAX}-R_K)/(R_{MAX}-R_{MIN})*Y$$

$$T_{MIN}=S_k(R_{MIN}-R_K)/(R_{MAX}-R_{MIN})*Y \quad \text{Eq. 10}$$

where $|Y_{MAX}|=|Y_{MIN}=Y$. $T_{MAX}$ specifies the top of the sliding window, while $T_{MIN}$ specifies the bottom of the sliding window.

After computing the load tracking value y(n) for the current evaluation period, the mobile station 100 compares the current load tracking value y(n) to the sliding window. If the current load tracking value y(n) is within the sliding window, the mobile station 100 sets the rate change probability P(n) to 0. If the load tracking value y(n) is outside of the sliding window, the mobile station 100 computes the rate change probability P(n) as previously described. Those skilled in the art will appreciate that, instead of setting the rate change probability to 0 when the load tracking value y(n) is within the sliding window, either the load tracking value y(n) or the rate change probability P(n) could be multiplied by an adjustment factor to reduce the probability of rate change.

Applying a rate dependent sliding window or mask as described above will tend to cause the mobile stations 100 to converge to the same transmission rate. High rate mobile stations 100 will ignore commands to increase transmission rates while responding to commands to decrease transmission rates. Conversely, low rate mobile stations 100 will respond to commands to increase transmission rate, while ignoring commands to decrease transmission rate. As a consequence, the transmission rates for all mobile stations 100 will tend to converge to a common value.

Having all mobile stations 100 transmit at the same rate will tend to reduce system throughput because mobile stations 100 operating under favorable conditions will have their data transmission rate constrained by other mobile stations 100 operating under less favorable conditions. To improve throughput, mobile stations 100 operating under advantageous conditions should be allowed to transmit at higher rates than mobile stations 100 under less favorable conditions.

FIG. 8 illustrates a method of determining rate change probabilities that are power dependent. Again, the concept of a sliding window or mask is used. The position of the sliding window is determined based on the mobile station's current transmit power $P_K$ instead of the mobile station's current rate level $R_K$. If a given mobile station 100 is transmitting with low power, the sliding window will be near the top of the load tracking range. Conversely, if the mobile station 100 is currently transmitting with high power, the sliding window will be near the bottom of the low tracking range. For a mobile station 100 transmitting at a power level somewhere in the middle, the sliding window will be somewhere in the middle of the low tracking range. The position of the sliding window may be calculated according to:

$$T_{MAX}=S_k(P_{MAX}-P_K)/(P_{MAX}-P_{MIN})/*Y$$

$$T_{MIN}=S_k(P_{PMIN}-P_K)/(P_{MAX}-P_{MIN})*Y' \quad \text{Eq. 11}$$

where If $P_{MAX}$ is the maximum transmit power, $P_{MIN}$ is the minimum transmit power, and $P_K$ is the current transmission power of the mobile station 100.

When the mobile stations 100 receive the load indication b(n) from the RBS 36, the mobile stations 100 compute the load tracking value y(n) and compare the load tracking value y(n) to the sliding window. If the load tracking value y(n) is within the sliding window, the mobile stations 100 may set the rate change probability P(n) to 0. If the load tracking value y(n) is outside of the sliding window, the mobile stations 100 may compute the rate change probability P(n) as previously described. Mobile stations 100 operating at a low transmit power will tend to ignore commands to reduce transmission rate, while mobile stations 100 with high transmit power will tend to ignore commands to increase transmission rate. Consequently, the transmit power for all mobile stations 100 will tend to converge to a common transmit power level.

When all mobile stations transmit at the same power level, the transmission rates will be dependent on the conditions of the reverse link channel. Those mobile stations 100 operating under better conditions will transmit at a higher rate than mobile stations 100 operating under adverse conditions. This rate control method results in "proportionally fair" rates to the mobile stations 100.

In the case of a mobile station 100 in soft handoff, the mobile station 100 may combine the load indications b(n) from the RBSs 36 in its active set. Soft combining of the load indications b(n) to compute the load tracking value may be performed according to:

$$y(n)=\beta\text{primary}(\gamma_i(n))+(1-\beta)\text{mean}(\gamma_i(n)) \quad \text{Eq. 12}$$

where $\gamma_i$(n) is the load tracking value generated on the ith soft link at frame (n). In Eq. 12, the mobile station computes a weighted average of the load tracking value from the primary RBS 36 and the mean load tracking value from all RBSs 36 in its active set. Alternatively, the mobile station 100 could set the load tracking value equal to the greater of the load tracking value from the primary RBS 36 and the mean load tracking value from all RBSs 36.

What is claimed is:

1. A method of dynamically adjusting the transmission rate of a mobile station, comprising:

receiving periodic load indications from a base station;

calculating a load tracking value based on two or more periodic load indications;

determining a rate change probability as a function of the load tracking value; and selectively changing the transmission rate of the mobile station responsive to a current rate control command based on the rate change probability, by comparing the rate change probability to a random probability value, and adjusting the data transmission rate of the mobile station based on the outcome of the comparison.

2. The method of claim 1 wherein calculating a load tracking value based on two or more periodic load indications comprises calculating a weighted average of two or more periodic load indications.

3. The method of claim 2 wherein the periodic load indications are received from said base station at a predetermined rate control interval, and wherein calculating a weighted average of two or more periodic load indications comprises calculating a weighted average of a current periodic load indication for a current rate control interval and at least one previous periodic load indication for a previous rate control interval.

4. The method of claim 2 wherein calculating a weighted average of two or more periodic load indications comprises calculating the weighted average with an exponential decay function.

5. The method of claim 1 wherein calculating a load tracking value based on two or more periodic load indications comprises calculating a running average of two or more periodic load indications over a sliding time window.

6. The method of claim 5 wherein the running average is a weighted average.

7. The method of claim 1 wherein calculating a load tracking value based on two or more periodic load indications comprises evaluating a continuous load tracking function that converts discrete periodic load indications from the base station to a continuous load tracking value.

8. The method of claim 1 wherein determining a rate change probability as a function of the load tracking value comprises calculating the rate change probability based on the distance of the load tracking value from a target load tracking value.

9. The method of claim 8 wherein the rate change probability increases with distance over at least a defined range of load tracking values.

10. The method of claim 9 wherein the rate change probability varies linearly over the defined range of load tracking values.

11. The method of claim 10 wherein the defined range is the entire range of possible values of the load tracking function.

12. The method of claim 1 wherein determining a rate change probability as a function of the load tracking value comprises scaling the load tracking value to generate the rate change probability.

13. The method of claim 1 wherein the rate change probability is a continuous rate change probability.

14. The method of claim 1 wherein determining a rate change probability as a function of the load tracking value comprises taking the load tracking value as the rate change probability over at least a defined range of load tracking values.

15. The method of claim 1 further comprising:

determining a sliding window in the range of possible load tracking values;

comparing the load tracking value to the sliding window to obtain a comparison result; and determining the rate change probability based on an outcome of the comparison result.

16. The method of claim 15 wherein determining the rate change probability based on an outcome of the comparison result comprises setting the rate change probability dependent on whether the load tracking value is within the sliding window.

17. The method of claim 16 wherein setting the rate change probability dependent on whether the load tracking value is within the sliding window comprises setting the rate change probability to zero when the load tracking value is within the sliding window.

18. The method of claim 15 wherein determining a sliding window in the range of possible load tracking values comprises determining the position of the sliding window in the load tracking range dependent on the current transmission rate of the mobile station.

19. The method of claim 15 wherein determining a sliding window in the range of possible load tracking values comprises determining the position of the sliding window in the load tracking range dependent on the current transmission power of the mobile station.

20. The method of claim 1 wherein determining a rate change probability is dependent on a user class associated with a user of the mobile station.

21. The method of claim 1 wherein determining a rate change probability is dependent on a quality of service criteria.

22. A mobile station comprising:

a receiver for receiving periodic load indications from a base station;

a transmitter for transmitting signals to the base station at a variable data transmission rate dependent on the load indications;

a controller to vary the data transmission rate of the mobile station, said controller operative to:

calculate a load tracking value based on two or more periodic load indications;

determine a rate change probability as a function of the load tracking value; and selectively change the data transmission rate of the mobile station responsive to a current rate control command based on the rate change probability, by comparing the rate change probability to a random probability value, and adjusting the data transmission rate of the mobile station based on the outcome of the comparison.

23. The mobile station of claim 22 wherein the controller calculates the load tracking value by calculating a weighted average of two or more periodic load indications.

24. The mobile station of claim 23 wherein the periodic load indications are received from said base station at a predetermined rate control interval, and wherein the controller calculates the weighted average of a current periodic load indication for a current rate control interval and at least one previous periodic load indication for a previous rate control interval.

25. The mobile station of claim 23 wherein the controller calculates the weighted average with an exponential decay function.

26. The mobile station of claim 22 wherein the controller calculates the load tracking value by calculating a running average of two or more periodic load indications over a sliding time window.

27. The mobile station of claim 26 wherein the running average is a weighted average.

28. The mobile station of claim 22 wherein the controller calculates the load tracking value by evaluating a continuous load tracking function that converts discrete periodic load indications from the base station to a continuous load tracking value.

29. The mobile station of claim 22 wherein the controller determines a rate change probability based on the distance of the load tracking value from a target load tracking value.

30. The mobile station of claim 29 wherein the rate change probability increases with distance over at least a defined range of load tracking values.

31. The mobile station of claim 30 wherein the rate change probability varies linearly over the defined range of load tracking values.

32. The mobile station of claim 31 wherein the defined range is the entire range of possible values of the load tracking function.

33. The mobile station of claim 22 wherein the controller determines a rate change probability by scaling the load tracking value.

34. The mobile station of claim 22 wherein the rate change probability is a continuous rate change probability.

35. The mobile station of claim 22 wherein the controller takes the load tracking value as the rate change probability over at least a defined range of load tracking values.

36. The mobile station of claim 22 wherein the controller is further operative to:

determine a sliding window in the range of possible load tracking values;

compare the load tracking value to the sliding window to obtain a comparison result; and determine the rate change probability based on an outcome of the comparison result.

37. The mobile station of claim 36 wherein the controller sets the rate change probability dependent on whether the load tracking value is within the sliding window.

38. The mobile station of claim 37 wherein the controller sets the rate change probability to zero when the load tracking value is within the sliding window.

39. The mobile station of claim 36 wherein the controller determines a sliding window in the range of possible load tracking values dependent on the current transmission rate of the mobile station.

40. The mobile station of claim 36 wherein the controller determines a sliding window in the range of possible load tracking values dependent on the current transmission power of the mobile station.

41. The mobile station of claim 22 wherein the controller determines a rate change probability dependent on a user class associated with a user of the mobile station.

42. The mobile station of claim 22 wherein the controller determines a rate change probability dependent on a quality of service criteria.

* * * * *

UNITED STATES PATENT AND TRADEMARK OFFICE
CERTIFICATE OF CORRECTION

PATENT NO. : 7,599,394 B2
APPLICATION NO. : 10/718939
DATED : October 6, 2009
INVENTOR(S) : Hosein et al.

It is certified that error appears in the above-identified patent and that said Letters Patent is hereby corrected as shown below:

Title Page;
On Page 2, in Field (56), under "OTHER PUBLICATIONS", in Column 1, Line 2, delete "Enhance-ments" and insert -- Enhancements --, therefor.

On Page 2, in Field (56), under "OTHER PUBLICATIONS", in Column 1, Line 4, delete "2003." and insert -- 2003, --, therefor.

In Column 7, Line 48, delete "FIG. 6." and insert -- FIG. 6, --, therefor.

In Column 7, Line 58, in Eq 4, below Line 1, insert -- elseif ($L_{MAX}$ >= L(n) > $L_T$) {set b(n)=1} --.

In Column 7, Line 61, delete "Eq 4" and insert -- Eq. 4 --, therefor.

In Column 8, Line 23, after "may" delete "the" and insert -- be --, therefor.

In Column 9, Line 19, delete "$y_{i=}0$" and insert -- $\gamma_i=0$ --, therefor.

In Column 9, Line 20, delete "$\gamma_i \approx -0.5$" and insert -- $\gamma_i=-0.5$ --, therefor.

In Column 9, Line 40, delete "is $R_{MIN}$" and insert -- $R_{MIN}$ is --, therefor.

In Column 9, Line 48, delete "$|Y_{MIN}$" and insert -- $|Y_{MIN}|$ --, therefor.

In Column 9, Line 63, after "of" insert -- a --.

In Column 10, Line 30, in Eq. 11, after "($P_{MAX}$-$P_{MIN}$)" delete "/*Y" and insert -- *Y --, therefor.

In Column 10, Line 32, in Eq. 11, delete "($P_{PMIN}$" and insert -- ($P_{MIN}$ --, therefor.

In Column 10, Line 63, in Eq. 12, delete " $y(n)=\beta \mathrm{primary}(\gamma_i(n))+(1-\beta)\mathrm{mean}(\gamma_i(n))$ " and insert -- $y(n) = \beta\, primary(y_i(n)) + (1-\beta)\, mean(y_i(n))$ --, therefor.

In Column 10, Line 65, delete "$\gamma_i(n)$" and insert -- $y_i(n)$ --, therefor.

Signed and Sealed this

Ninth Day of February, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,599,394 B2
APPLICATION NO. : 10/718939
DATED : October 6, 2009
INVENTOR(S) : Hosein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1719 days.

Signed and Sealed this

Twenty-eighth Day of September, 2010

David J. Kappos

*Director of the United States Patent and Trademark Office*